United States Patent
genannt Berghegger et al.

(10) Patent No.: US 8,853,884 B2
(45) Date of Patent: Oct. 7, 2014

(54) TECHNIQUES FOR REDUCING NO LOAD POWER IN ELECTRONIC DEVICES

(75) Inventors: Ralf Schröder genannt Berghegger, Glandorf (DE); Reinhold Schulz, Versmold (DE); Florian Schäfer, Bad Bentheim (DE)

(73) Assignee: Flextronics AP, LLC, Broomfield, CO (US)

( * ) Notice: Subject to any disclaimer, the term of this patent is extended or adjusted under 35 U.S.C. 154(b) by 786 days.

(21) Appl. No.: 12/702,547

(22) Filed: Feb. 9, 2010

(65) Prior Publication Data

US 2010/0201208 A1    Aug. 12, 2010

Related U.S. Application Data

(60) Provisional application No. 61/151,003, filed on Feb. 9, 2009.

(51) Int. Cl.
*H02J 3/14* (2006.01)
*H02J 9/00* (2006.01)
*H02M 1/00* (2006.01)

(52) U.S. Cl.
CPC ........... *H02J 9/005* (2013.01); *H02J 2009/007* (2013.01); *H02M 2001/0032* (2013.01); *Y02B 70/16* (2013.01)
USPC ............... 307/38; 307/25; 307/125; 307/128; 307/130; 307/131; 363/142; 363/146; 361/18

(58) Field of Classification Search
USPC ............... 307/25, 38, 86, 125, 128, 130–131; 363/16, 18, 89, 101, 142, 146; 361/18
See application file for complete search history.

(56) References Cited

U.S. PATENT DOCUMENTS

| | | | | |
|---|---|---|---|---|
| 5,642,267 A * | 6/1997 | Brkovic et al. | ................... | 363/16 |
| 6,937,490 B2 * | 8/2005 | MacDonald et al. | ......... | 363/142 |
| 6,986,067 B2 * | 1/2006 | Odaohhara et al. | ........... | 713/320 |
| 7,224,086 B2 * | 5/2007 | Germagian et al. | .......... | 307/128 |
| 7,245,515 B2 * | 7/2007 | Chiang | ........................ | 363/146 |
| 7,315,097 B2 * | 1/2008 | Tajika | .......................... | 307/131 |
| 7,782,642 B2 * | 8/2010 | Unger et al. | ................... | 363/146 |
| 7,852,645 B2 * | 12/2010 | Fouquet et al. | ................. | 363/81 |
| 8,223,522 B2 * | 7/2012 | Telfus | .......................... | 363/125 |
| 8,432,067 B2 * | 4/2013 | Eikum | ......................... | 307/119 |
| 2004/0001346 A1 * | 1/2004 | McDowell et al. | ............. | 363/89 |
| 2004/0056533 A1 * | 3/2004 | Chen | ............................... | 307/25 |
| 2005/0024895 A1 * | 2/2005 | Mabanta et al. | ................ | 363/18 |
| 2005/0141252 A1 * | 6/2005 | Mollo | ............................ | 363/101 |
| 2006/0082934 A1 * | 4/2006 | Price et al. | ..................... | 361/18 |
| 2009/0295233 A1 * | 12/2009 | McGinley et al. | ............. | 307/126 |
| 2009/0300400 A1 * | 12/2009 | DuBose | ........................ | 713/340 |

* cited by examiner

*Primary Examiner* — Jared Fureman
*Assistant Examiner* — Alfonso Perez Borroto
(74) *Attorney, Agent, or Firm* — Haverstock & Owens LLP

(57) ABSTRACT

Systems and methods ("utility") are provided for reducing the no-load (standby) power of power devices such as chargers for electronic devices and power converters for electronic devices. The utility may include a controllable switch that is operative to decouple circuitry of the power device from a power source under certain no-load conditions. In one embodiment, the utility provides a switch control module that is operative to sense when an electronic device is coupled to the power device, and in response, to control the switch to couple the power device to the power source. The switch control module may also be operative to detect a condition when the electronic device is no longer drawing power from the power device, and in response, to control the switch to decouple the power device from the power source.

20 Claims, 11 Drawing Sheets

US 8,853,884 B2

TECHNIQUES FOR REDUCING NO LOAD POWER IN ELECTRONIC DEVICES

CROSS-REFERENCE TO RELATED APPLICATION

This application claims priority under 35 U.S.C. 119 to U.S. Provisional Application No. 61/151,003 entitled: "TECHNIQUES FOR REDUCING NO LOAD POWER IN ELECTRONIC DEVICES," filed on Feb. 9, 2009, the contents of which are incorporated herein as if set forth in full.

BACKGROUND

The recent proliferation of rechargeable electronic devices, such as mobile telephones, PDA's and notebook computers has dramatically increased. Even when turned "off," many of these devices continue to use power, referred to as "standby power" or "no-load power," to operate features such as clocks, timers, touch pads, or to receive signals (e.g., from remote controls). Battery chargers, such as mobile phone chargers, and external power supplies (e.g., notebook computer power supplies) draw power when they are plugged in to an outlet, even if the associated device is fully charged or even disconnected.

Although the standby power consumption of most of these devices is relatively small, the number of devices drawing standby power is very large and is growing rapidly. For example, currently standby power may account for over 10 percent of all electric power used in a typical home. Environmental and economic considerations therefore make it desirable to significantly reduce the standby power of electronic equipment and chargers.

It is against this background that the techniques for reducing no-load (or standby) power in electronic devices described herein have been developed.

SUMMARY

These techniques include a power device operative to provide power to an electronic device, the power device including a power converter that is operative to receive input power from a power source and to provide output power to the electronic device; a switch disposed between the power converter and the power source; and a switch control module operative to selectively couple the power converter to the power source.

The switch control module may be operative to detect a touch from a user of the power device, and in response to the detecting, to couple the power converter to the power source. The switch control module may be operative to detect a no-load condition, and in response to the detecting, to decouple the power converter from the power source.

The techniques also include a method for reducing the no-load power consumption of a power device, the power device being operative to receive power from a power source and to provide power to an electronic device. The method includes operating circuitry of the power device to automatically detect a no-load condition; and in response to the operating, automatically decoupling the power device from the power source.

The techniques also include a power device operative to provide power to an electronic device, the power device including: a rectifier that converts AC input power received from an AC power source to rectified power; a power converter that converts the rectified power to DC output power that can be supplied to an electronic device; a switch located between the rectifier and the power converter to selectively couple rectified power to the power converter when the switch is closed and substantially decouple the rectified power from the power converter when the switch is open; and a switch controller coupled to the switch to control the open or closed status of the switch based on a no-load condition.

The no-load condition may be sensed within the power converter. The no-load condition may be sensed within the power converter by monitoring the current through a winding in a transformer within the power converter. The power device may further include a snubber circuit coupled to the winding. The winding utilized in the power converter may be a primary winding. The power device may further include an indication received from the electronic device to initially close the switch and couple the rectified power to the power converter. The no-load condition may be sensed by monitoring the current through a capacitor coupled between the power device and the electronic device. The electronic device may include a switch therein that controls the ability of the capacitor to carry current therethrough.

The techniques also include a power device operative to provide power to an electronic device, the power device including: a rectifier that converts AC input power received from an AC power source to rectified power; a power converter that converts the rectified power to DC output power that can be supplied to an electronic device; a switch located between the rectifier and the power converter to selectively couple rectified power to the power converter when the switch is closed and substantially decouple the rectified power from the power converter when the switch is open, the switch having an input; and a circuit connected to the input of the switch to maintain the switch in the closed position in the presence of sufficient current through the circuit and the open the switch in the absence of sufficient current through the circuit.

The circuit may include a winding in a transformer within the power converter. The power device may further include a snubber circuit coupled to the winding. The winding utilized in the power converter may be a primary winding. The power device may further include an indication received from the electronic device to initially close the switch and couple the rectified power to the power converter. The circuit includes a capacitor coupled between the power device and the electronic device. The electronic device includes a switch therein that controls the ability of the capacitor to carry current therethrough.

DETAILED DESCRIPTION

Figure 1:
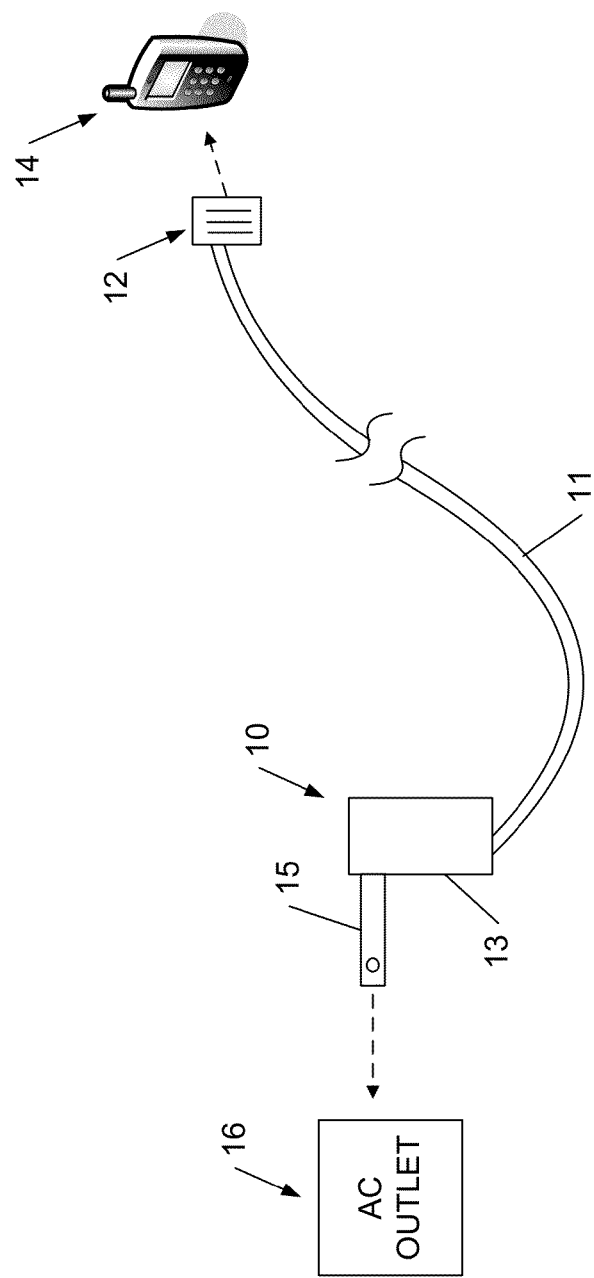
FIG. 1 illustrates an exemplary mobile phone charger that includes components for providing reduced no-load power consumption.

While the invention is susceptible to various modifications and alternative forms, specific embodiments thereof have been shown by way of example in the drawings and are herein described in detail. It should be understood, however, that it is not intended to limit the invention to the particular form disclosed, but rather, the invention is to cover all modifications, equivalents, and alternatives falling within the scope and spirit of the invention as defined by the claims.

Embodiments of the present invention are directed to reducing the no-load power consumption of electronic devices such as phone chargers, notebook power supplies, and the like. The techniques described herein operate to reduce the no-load power consumption of the electronic devices automatically. That is, users do not need to intentionally toggle a switch or unplug a device from an AC power source to provide the reduced power consumption features. Further, the techniques for providing reduced no-load power consumption described herein utilize power from the AC power source, such that additional power sources are not required.

FIG. 1 illustrates a mobile phone charger 10 that includes components to reduce no-load power consumption. The phone charger 10 may include a connector 12 that is coupled to a housing 13 via a cord 11. The connector 12 may be configured to be selectively coupleable (i.e., "plugged in") to a mobile phone 14. Further, the housing 13 of the charger 10 may include prongs 15 that enable the charger 10 to be plugged into an AC outlet 16.

In operation, the mobile phone charger 10 receives AC input power from the AC outlet 16 and conditions the power to a form that is suitable for charging a battery of the mobile phone 14. As can be appreciated, the housing 13 of the charger 10 may include various electronic components (e.g., rectifiers, converters, filters, and the like) to perform the intended function. These electronic components may tend to consume power after the battery of the mobile phone 14 has been fully charged, and even after the mobile phone 14 has been unplugged from the connector 12 when the charger 10 remains connected to the AC outlet 16.

Figure 2:
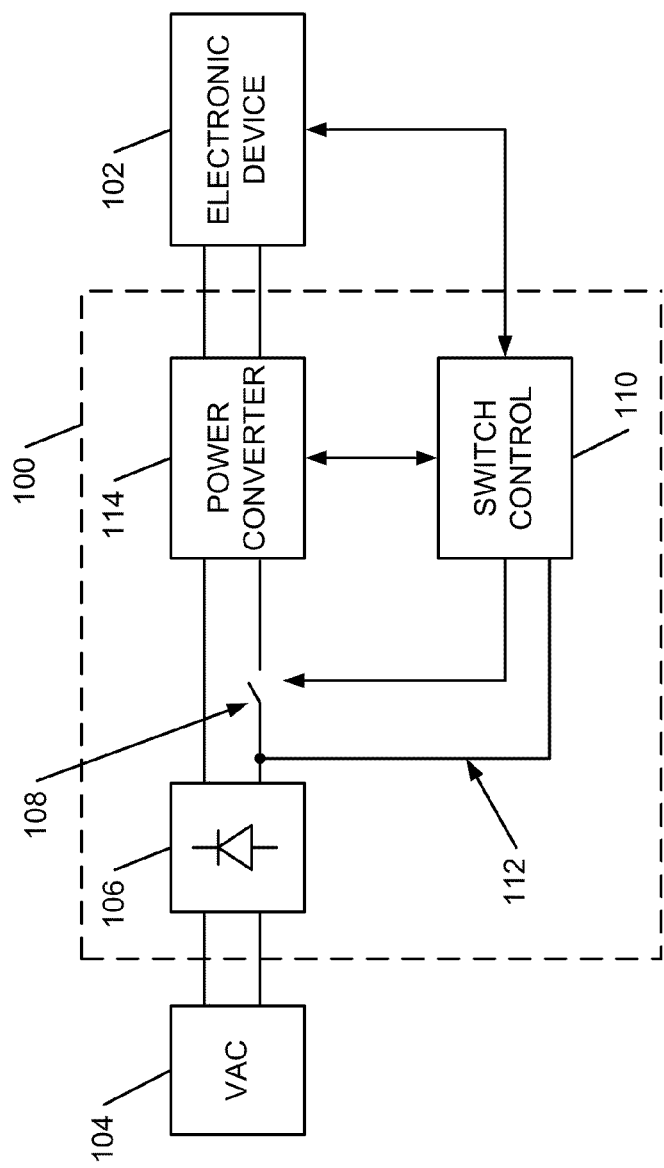
FIG. 2 illustrates a block diagram of an exemplary power converter such as a phone charger that includes components for providing reduced no-load power consumption.

FIG. 2 illustrates a block diagram of a power device 100 (e.g., a mobile phone charger or notebook computer power converter) that is coupled to an electronic device 102 (e.g., a mobile phone or notebook computer) and an AC power source 104. The power device 100 may include a rectifier 106 that is operable to convert the AC input power to rectified AC power. Further, the power device 100 may include a power converter 114 (e.g., a DC-DC converter) operable to convert the rectified AC voltage in to a DC voltage level that is suitable to be coupled to the electronic device 102.

As shown, the power device 100 may include a switch 108 positioned in series with the circuit between the AC power source 104 and the power converter 114. As an example, the switch 108 may include a field effect transistor (FET) or an insulated gate bipolar transistor (IGBT). As can be appreciated, when the switch 108 is opened, the power converter 114 will draw very little power from the AC input source 104 due to the open circuit condition. Conversely, when the switch 108 is closed, the power converter 114 will be coupled to the AC power source 104 so that the power converter 114 may operate normally.

The power device 100 may also include a switch control module 110 that is operable to control the opening and closing of the switch 108. As shown, the switch control module 110 may be electrically coupled to the rectified input power by a node 112 such that it does not require an additional power source and does not draw power from the electronic device 102. Further, the switch control module 110 may be coupled to the power converter 114 and/or the electronic device 102 (e.g., through a connector, such as the connector 12 shown in FIG. 1).

The switch control module 110 may be operable to open the switch 108 under certain no-load conditions when it may be desirable to decouple the power converter 114 from the AC power source 104. For example, such conditions may include when the battery of the electronic device 102 is fully charged, or when the electronic device 102 is unplugged from the power device 100 and the power device 100 remains coupled to the AC power source 104. The switch control module 110 may detect these conditions using any suitable method. For example, the switch control module 110 may be operable to sense that the current flowing from the AC power source 104 is below a certain threshold, which may indicate that the electronic device 102 is no longer connected to the power device 100 or that the battery of the electronic device 102 is fully charged. As another example, the switch control module 110 may receive a signal (e.g., from the power converter 114 and/or the electronic device 102) that indicates that the switch 108 should be opened because there is "no-load" from the electronic device 102. As yet another example, the switch control module 110 may be operative to sense a touch by a user, and in response to the touch, to close the switch 108 so that the power device 100 may provide power to the electronic device 102.

FIGS. 3-11 illustrate a plurality of exemplary techniques that may be implemented to provide reduced no-load (or standby) power consumption for electronic devices such as mobile phone chargers, notebook compute power converters, and the like. In each of the FIGS. 3-11, like components are identified with like reference numerals. Further, components or groups of components that are shown in multiple embodiments may be described in relation to the first figure in which they are illustrated. Additionally, the various components or groups of components may be implemented in any suitable combination to achieve the desired functionality.

Figure 3:
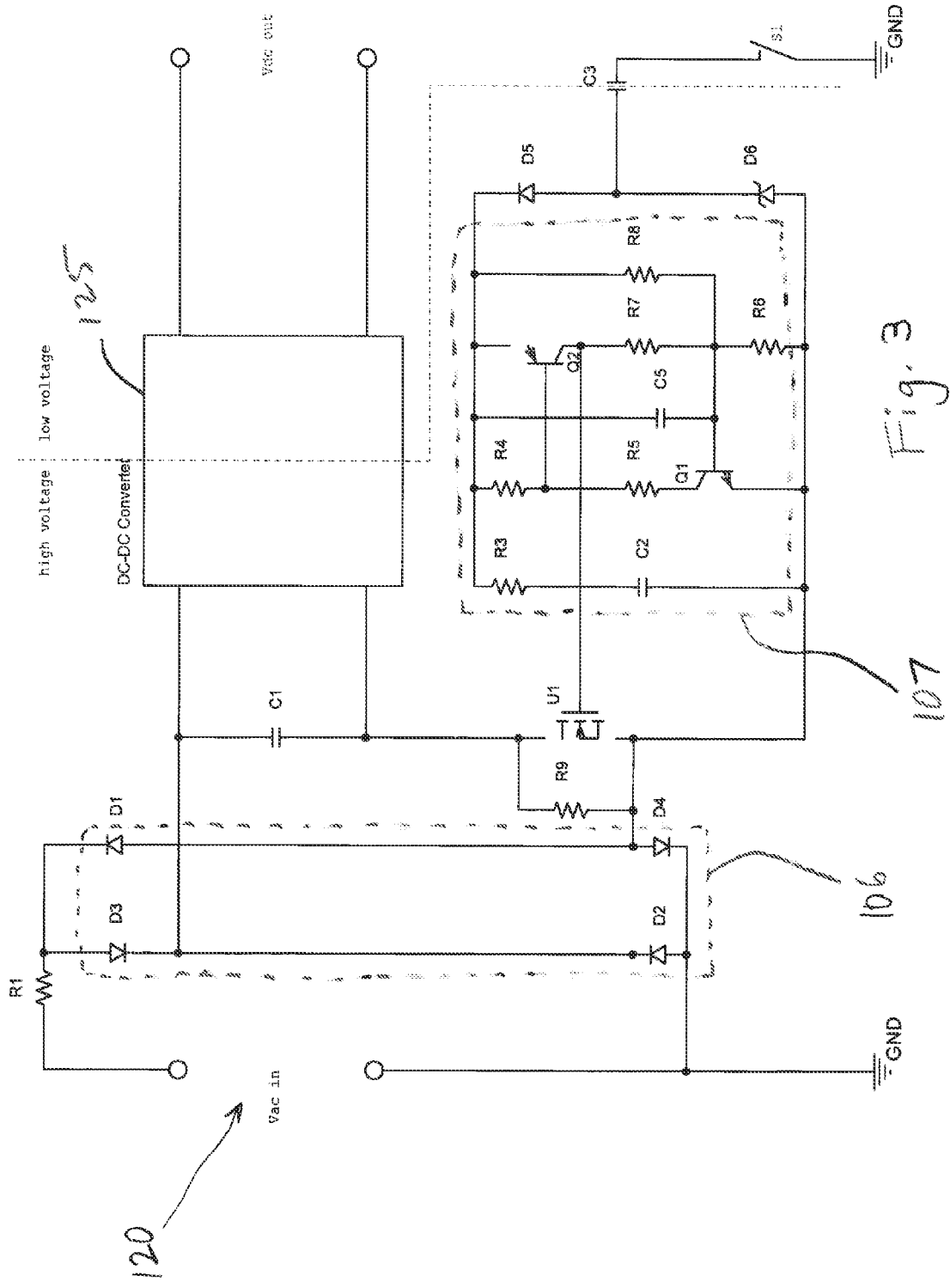
FIGS. 3-11 illustrate circuit schematic diagrams of various embodiments of exemplary power converters that include components for providing reduced no-load power consumption.

FIG. 3 illustrates one embodiment of a circuit that reduces the no-load power consumption for a DC-DC converter 125 that may be part of a power supply or charger (e.g., the phone charger 10 shown in FIG. 1). As shown, the output of the DC-DC converter 125 may be a DC voltage (Vdc out), which may be selectively coupled to an electronic device, such as the mobile phone 14 shown in FIG. 1. Further, the DC-DC converter 125 is coupled to an AC input power source 120, such as the AC power outlet 16 shown in FIG. 1, via the rectifier 106. The full-wave bridge rectifier 106 (also shown in FIG. 2), includes diodes D1, D2, D3, and D4. To smooth the rectified AC voltage, a reservoir capacitor C1 may be provided in parallel with the input terminals of the DC-DC converter 125. Additionally, a resistor R1 may be provided to limit the current through the circuit in the case where there is an abnormal voltage or current surge from the AC power source 120.

To provide the ability to reduce the no-load power consumption of the circuit, a switch U1 (e.g., FET, IGBT, or the like) is placed in series between the DC-DC converter 125 and the AC power source 120. As can be appreciated, when the switch U1 is closed, the circuit between the AC power source 120 and the DC-DC converter 125 is closed, such that the DC-DC converter 120 may operate normally. Conversely, when the switch U1 is open, the circuit is substantially open and the input current drawn from the AC power source 120 is reduced to a minimal level (e.g., the leakage current of the bridge rectifier 106 and the switch U1).

The switch U1 is controlled by a "Schmitt Trigger" circuit 107 that is coupled to the gate of the switch U1. The Schmitt Trigger 107 includes transistors Q1 and Q2, capacitors C2 and C5, and resistors R3, R4, R5, R6, R7, and R8. However, it should be appreciated that the Schmitt Trigger 107 may be implemented in any number of ways, some of which may include multiple transistors, comparator circuits, and/or integrated circuits. Generally, the Schmitt Trigger 107 operates to close the switch U1 when the voltage at C2 is above an upper trigger level, and to open the switch U1 when the voltage at C2 is below a lower trigger level. That is, the Schmitt Trigger 107 operates generally as a comparator with hysteresis.

To control the opening and closing of the switch U1, another switch S1 is provided. When the switch S1 is closed, current flows from a capacitor C3, through a rectifying diode D5, to increase the voltage level at C2 to a point where the Schmitt trigger 107 closes the switch U1, thereby coupling the DC-DC converter 125 to the AC input voltage source 125 through the rectifier 106. To provide this functionality, the capacitor C3 is coupled to bridge rectifier 106 through a Zener diode D6. Further, to ensure that current may flow through the capacitor C3 when the switch U1 is open, a high resistance resistor R9 may be provided in parallel with the switch U1. Upon the existence of a no load condition, S1 is switched off, so there is no current in C3. Therefore, C2 will not remain charged as C2 is continuously discharged via R3, R8 and R6 at no load condition (with S1 open). This ensures that the voltage at C2 drops. S1 can either be controlled by the load— (e.g., the load "tells" the power supply that it has to go into no load mode) or S1 is implemented in the secondary connector so that it is switched off when the load is disconnected.)

To make the operation of the switch S1 transparent to a user, the switch S1 may be toggled by a very small current that goes through the user when the user contacts a portion of the circuit. For example, in the mobile phone charger 10 shown in FIG. 1, the switch S1 may be closed when a user comes into contact with the connector 12, which may occur when the user plugs the mobile phone 14 into the connector 12. In this regard, the user's actions are operative to close the switch S1 without the user having to intentionally take steps to close the switch S1. As can be appreciated, other types of "contact" switching methods may be used to implement switch S1. For example, the capacitance of a user may be utilized to close the switch S1 using suitable circuitry.

As another example, the mobile phone 14 may include electronic or mechanical mechanisms that are configured to close the switch S1 when, for instance, the connector 12 is coupled to the mobile phone 14. For example, the mobile phone 14 or connector 12 may include a mechanical switch that is used for the switch S1 that is automatically closed when the mobile phone 14 is coupled to the connector 12. As can be appreciated, other techniques may be used to close the switch S1 at such a time when it is desirable for the DC-DC converter 125 to be coupled to the AC power source 120. Further, the switch S1 may be configured to remain closed (e.g., after a user has stopped touching the connector 12) such that the DC-DC converter 125 remains coupled to the AC power source 120 until the power device (e.g., the mobile phone charger 10 shown in FIG. 1) is unplugged from the AC power source 120, or until the electronic device (e.g., mobile phone 14) is unplugged from the power device.

Figure 4:
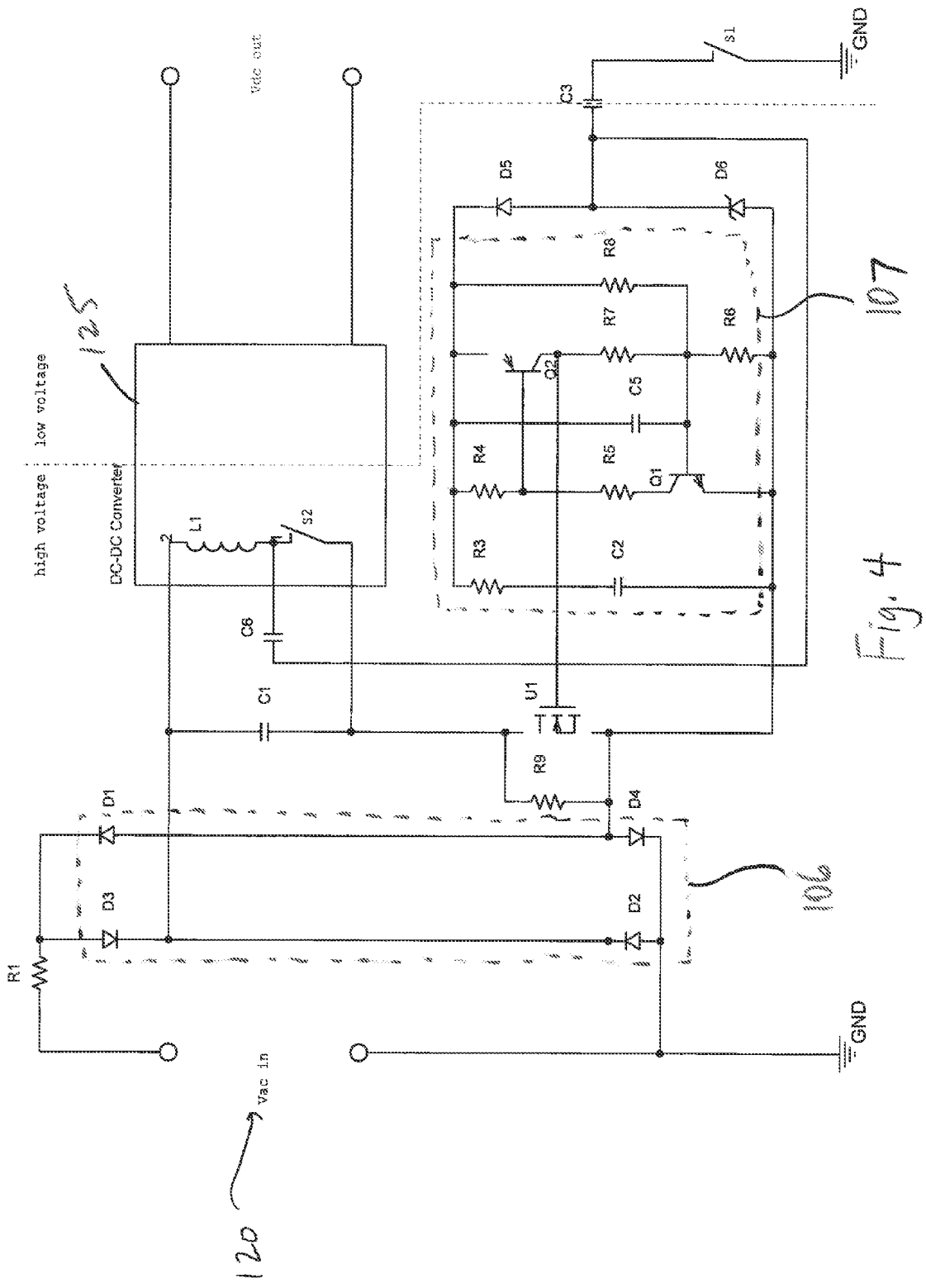

FIG. 4 illustrates a similar circuit to the one shown in FIG. 3, and therefore only differences between the circuits shown in FIG. 3 and FIG. 4 are described. The circuit in FIG. 4 is configured to automatically decouple the DC-DC converter 125 from the AC power source 120 (i.e., open the switch U1) when the current drawn by a load, such as the mobile phone 14 shown in FIG. 1, falls below a predetermined level. This feature is achieved by coupling the capacitor C3 to a coil L1 (e.g., the primary coil) of a transformer in the DC-DC converter 125 through a capacitor C6.

In operation, the switch U1 is initially closed in the same manner as the circuit shown in FIG. 3. That is, the switch U1 is closed when current from the capacitor C3 flows after the switch S1 has been closed. As noted-above, the switch S1 may be closed by the electronic device (e.g., a mobile phone) coupled to the power device, by providing one or more conducting surfaces that are touched by a user when coupling the electronic device to the power device, or by another suitable method In this embodiment, the operational properties of the DC-DC converter 125 are used to control the operation of the switch U1. The DC-DC converter 125 includes coil L1 that is used for transferring energy from the input of the DC-DC converter 125 to the output. The switching frequency and duty cycle of a switch S2 coupled to L1 controls the energy transfer from the input to the output of the DC-DC converter 125, in a conventional manner. In this regard, when the current drawn by the load is high, the switching frequency of the switch S2 is also high. Conversely, when the current drawn by the load is low (e.g., when the battery of an electronic device is fully charged or when the electronic device is disconnected from the power device), the switching frequency of the switch S2 is low.

The above-noted feature of the DC-DC converter 125 is used to control the switch U1, and therefore to control when the DC-DC converter 125 is coupled to the AC power source 120. When the current drawn by a load is relatively large, the switching frequency and the duty cycle of the switch S2 are large enough to provide enough current from the coil L1 through C6 to keep the switch U1 closed. Conversely, when the load current is low, the current through C6 is relatively small, which has the effect of causing the switch U1 to be opened. As can be appreciated, the circuit shown in FIG. 4 reduces the no-load power consumption of a power device by recognizing no-load conditions, and in response, decoupling the DC-DC converter 125 from the AC power source 120. As can be seen, the no-load condition is sensed when S1 is open and the output power (as sensed by the power in L1, by looking at the current through C6) drops below a certain level. One implementation of S1 can be to connect C3 to the surface of the secondary connector. Then, the user will close the contact to ground with his body (S1 is replaced by the user). So the user will not even recognize that he has activated the switch. In such case, C3 might be very small so the current through the user is so small that he does not recognize it.

Figure 5:
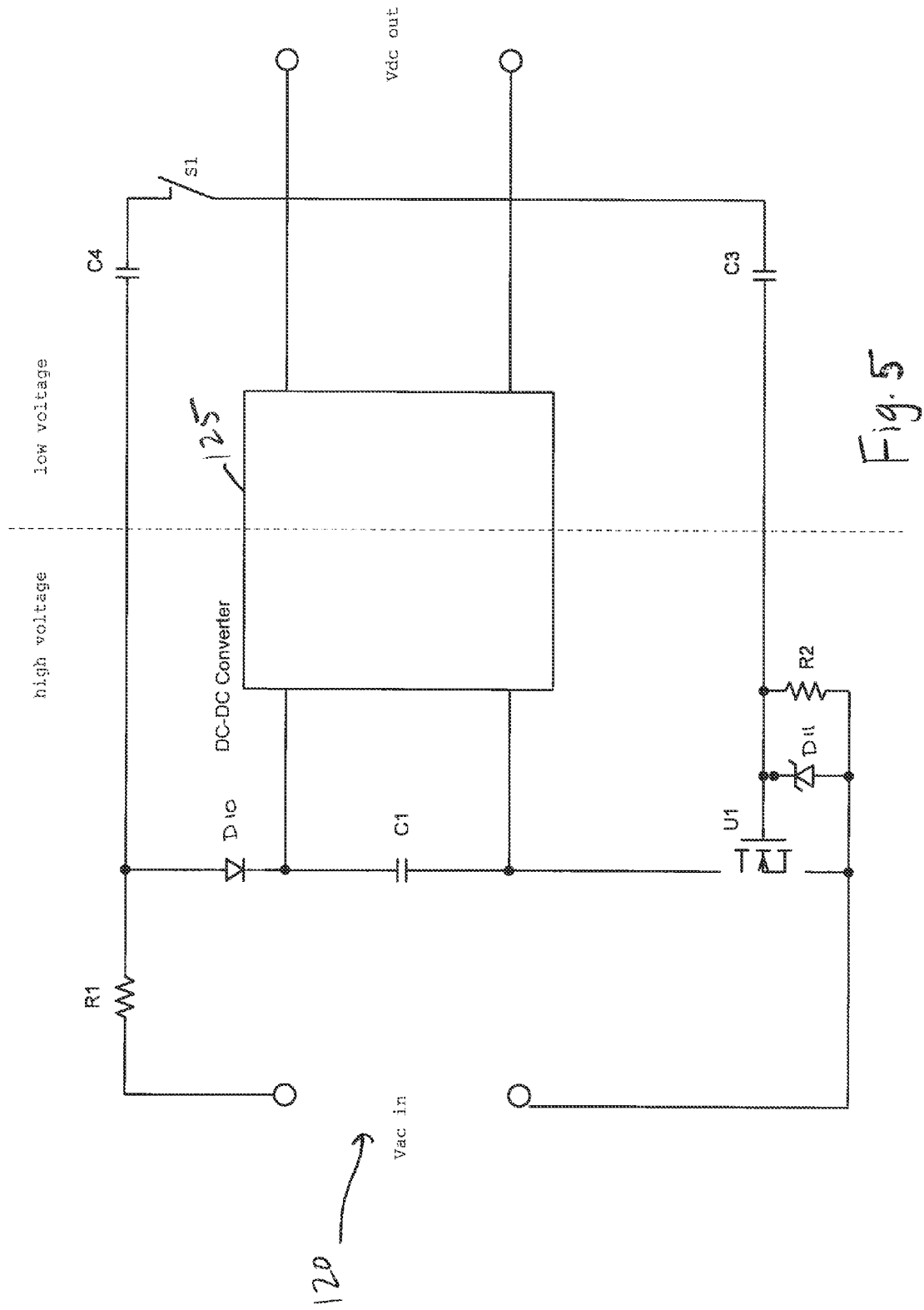

FIG. 5 illustrates another embodiment for reducing the no-load power consumption in a power device. In this embodiment, the full-wave bridge rectifier 106 is replaced with a half-wave rectifier implemented by a diode D10. Further, the switch S1 is coupled between a capacitor C4 and the capacitor C3, rather than between ground and the capacitor C3. In this configuration, the switch U1 is switched on and off synchronously with the voltage from the AC input power source 120. As shown, the circuit includes a diode D11 to limit the voltage at the gate of the switch U1, and a high resistance resistor R2 that is operable to drain current off of the gate of switch U1, thereby turning U1 off when the circuit has been disconnected from the AC power source 120. If S1 is open that breaks the circuit (Vac in-R1-C4-S1-C3-U1-Vac in), so for U1 it is the same as if the circuit is disconnected from the AC power source. Thus, R2 turns U1 off when S1 is open. In a no load condition, S1 is switched off. Therefore there is no current in C3, C4 and R2. So there is no voltage at R2. R2 is connected in parallel to the control input (G-S) of U1. If there is no voltage at G-S of U1, then U1 will be off.

Figure 6:
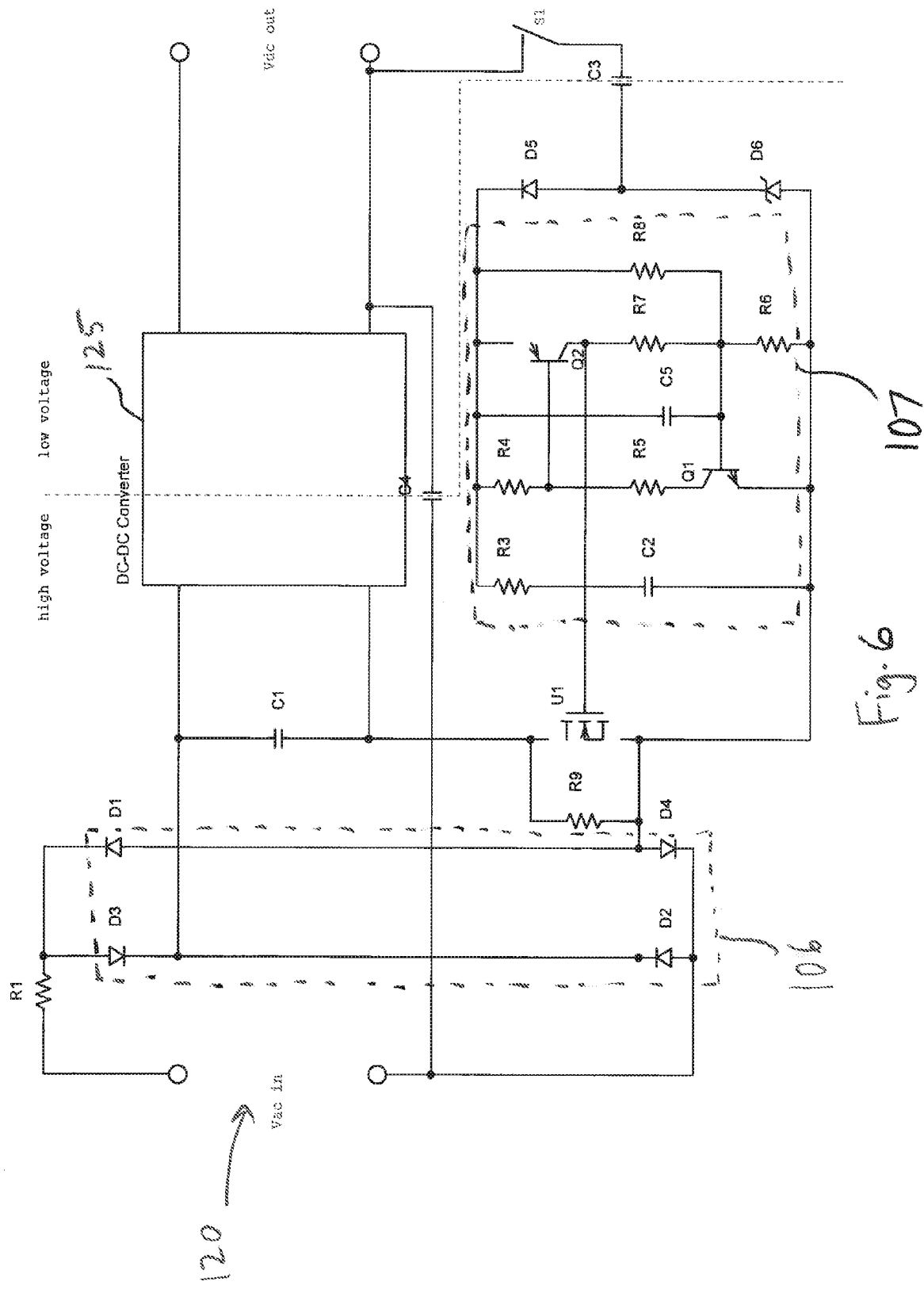

FIG. 6 illustrates another embodiment for reducing the no-load power consumption in a power device. In this embodiment, rather than coupling the capacitor C3 to ground, the switch S1 is coupled between the capacitor C3 and the negative terminal of the output of the DC-DC converter 125, which in turn is coupled to the negative terminal of the AC power source 120 through the capacitor C4. As can be appreciated, the circuit shown in FIG. 6 operates the same as the circuit shown in FIG. 3, except that in the circuit shown in FIG. 6 there is no need for a ground connection. So, the no load condition is sensed by the lack of current through C3.

Figure 7:
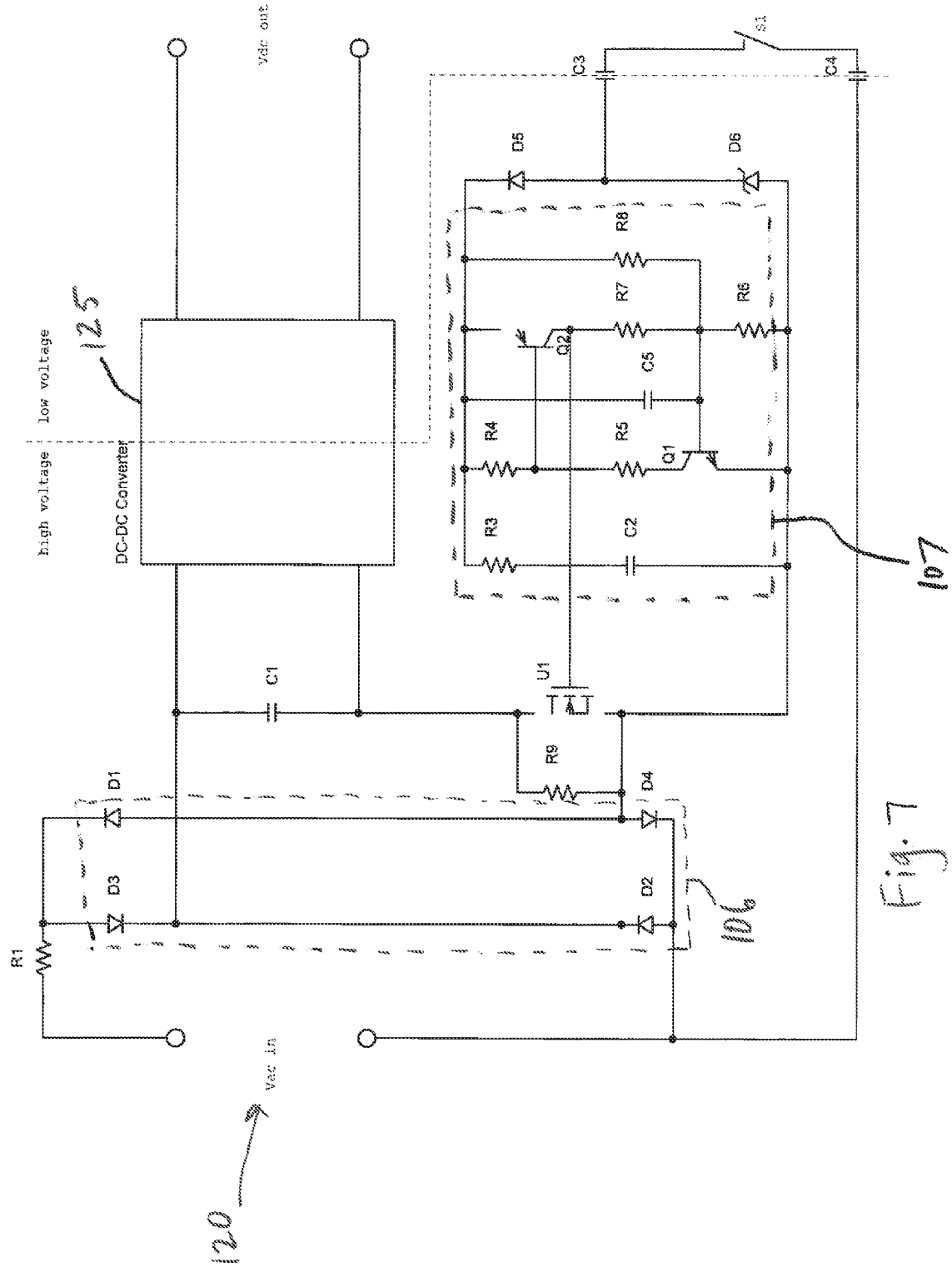

FIG. 7 illustrates another embodiment for reducing the no-load power consumption in a power device. This embodiment is substantially the same as the embodiment shown in FIG. 6, except that the capacitor C4 is directly coupled between the switch 51 and the negative terminal of the AC power source 120, rather than to the output terminal of the DC-DC converter 125. Thus, in this case as well, the no load condition is sensed by the lack of current through C3.

Figure 8:
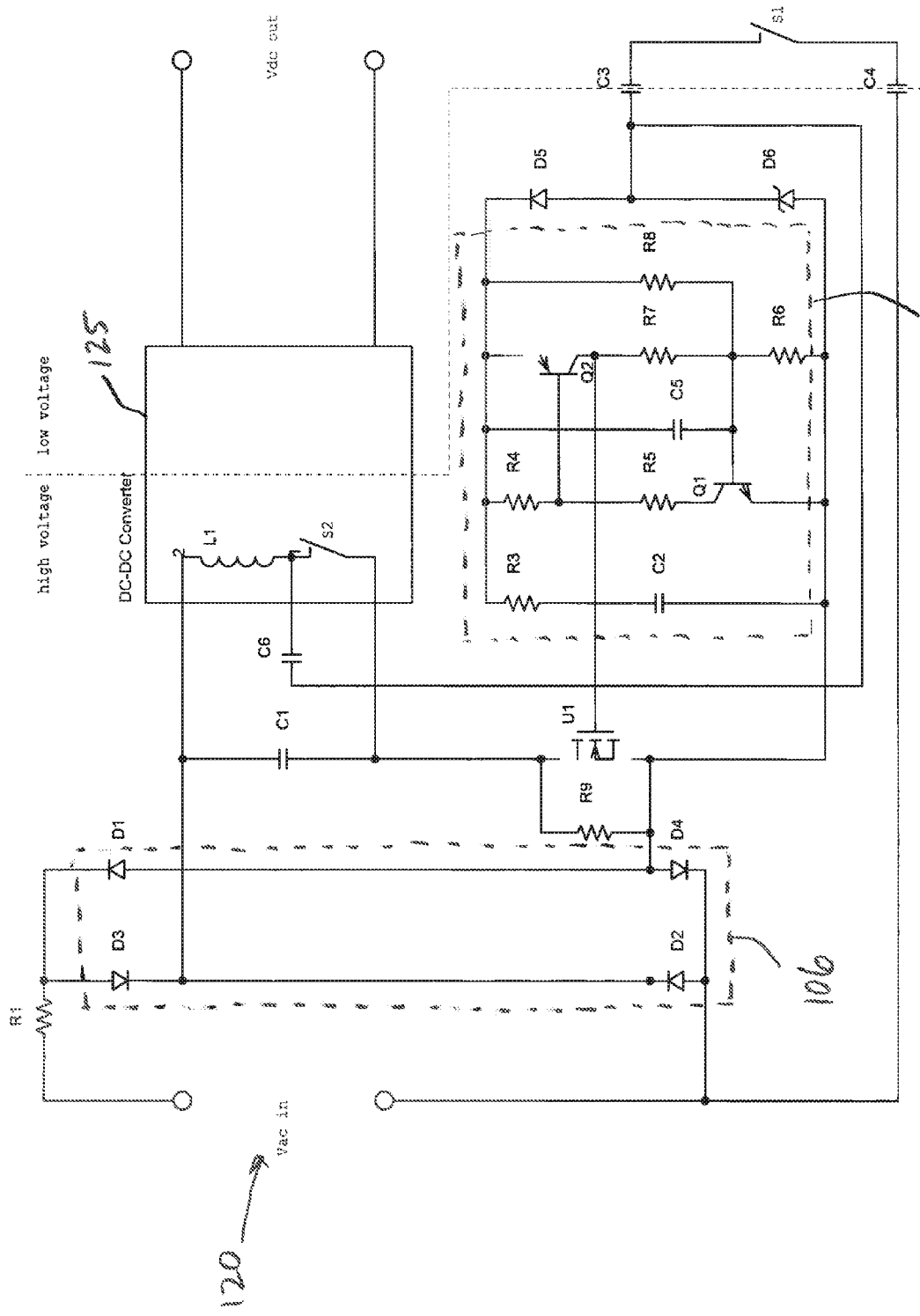

FIG. 8 illustrates another embodiment for reducing the no-load power consumption in a power device. The embodiment shown is essentially a combination of the circuit shown in FIG. 4 and the circuit shown in FIG. 7. That is, the switch 51 is coupled to the AC power source 120 through the capacitor C4, and the switching frequency and duty cycle of the switch S2 is utilized to turn the switch U1 off under no-load conditions, by again sensing the absence of sufficient current through C3.

Figure 9:
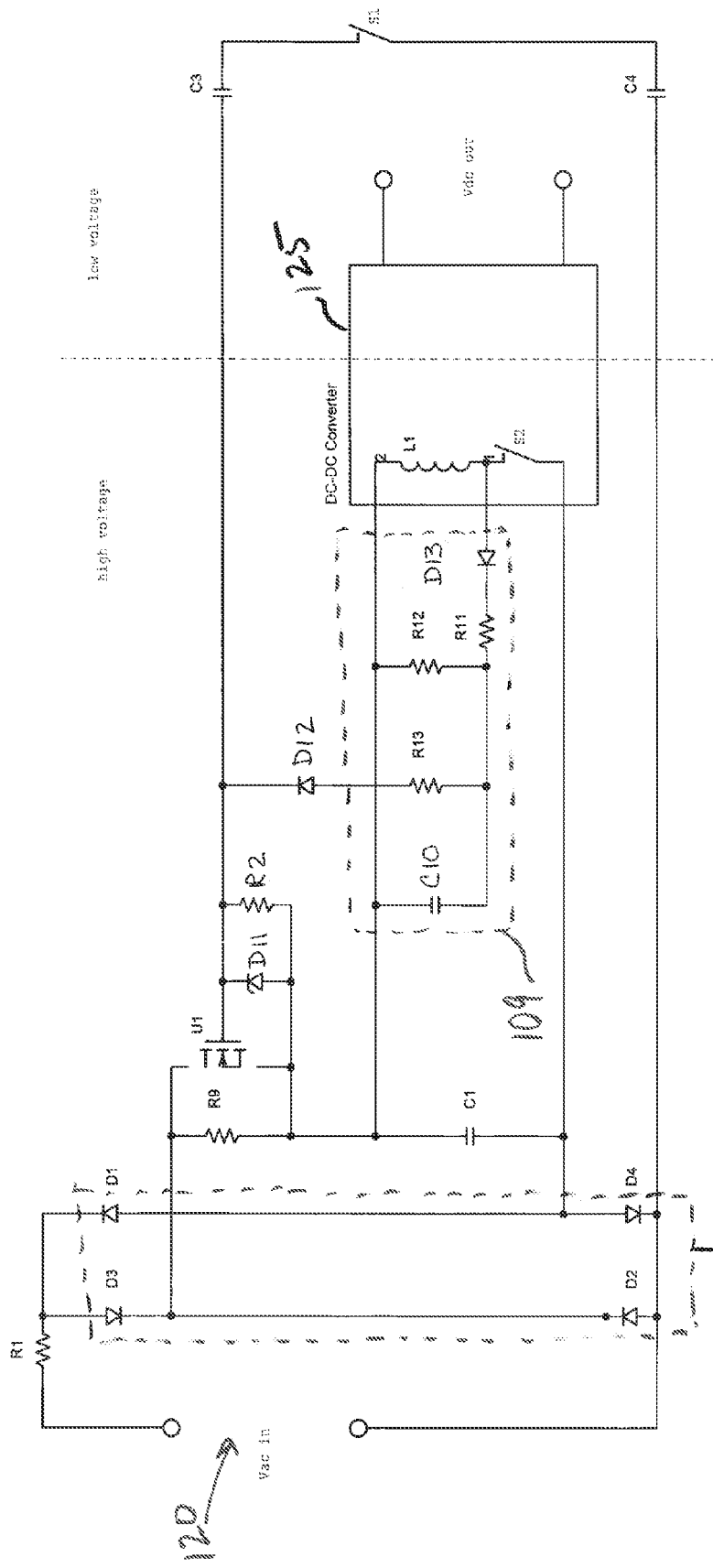

FIG. 9 illustrates another embodiment for reducing the no-load power consumption in a power device. In this embodiment, a snubber circuit 109 is provided which includes resistors R11, R12, and R13, a diode D13, and a capacitor C10 coupled to the transformer L1 of the DC-DC converter 125. The snubber circuit 109 absorbs energy from the coil L1 and provides a DC voltage through a diode D12 that is used to keep the switch U1 turned on, thereby coupling the DC-DC converter 125 to the AC power source 120. Thus, the no-load condition is sensed here by sensing/monitoring when the energy in the primary coil L1 drops below a certain level.

Figure 10:
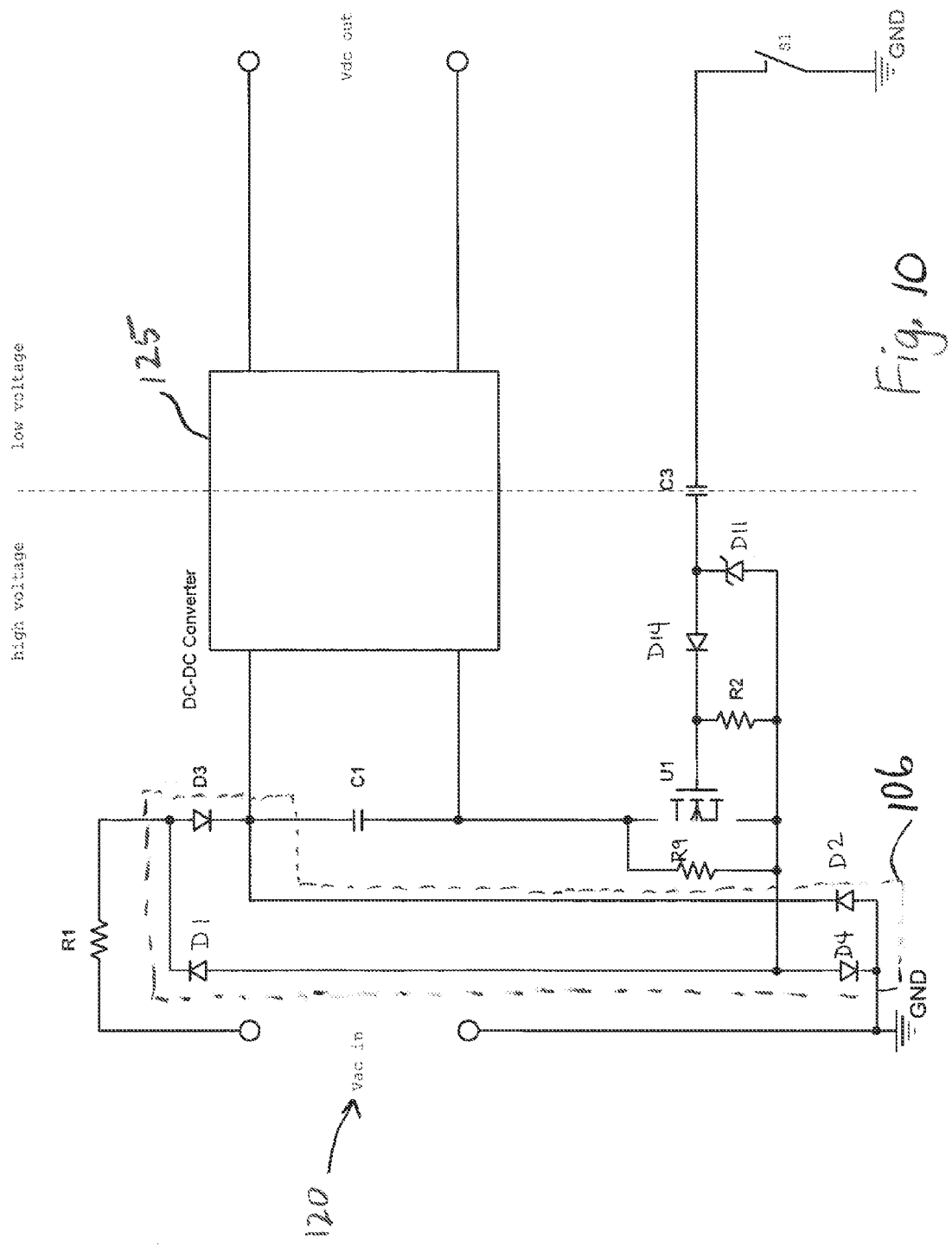

FIG. 10 illustrates another embodiment for reducing the no-load power consumption in a power device. In this embodiment, the current from the capacitor C3 through a diode D14 is used to charge the gate of the switch U1. Further, when there is little or no current from the capacitor C3 (e.g., due to the power device being unplugged from the AC power source 120), the switch U1 is turned off due to the voltage drop caused by the current through the high resistance resistor R2. Thus, the no-load condition is sensed by the absence of a path to ground (current) through C3.

Figure 11:
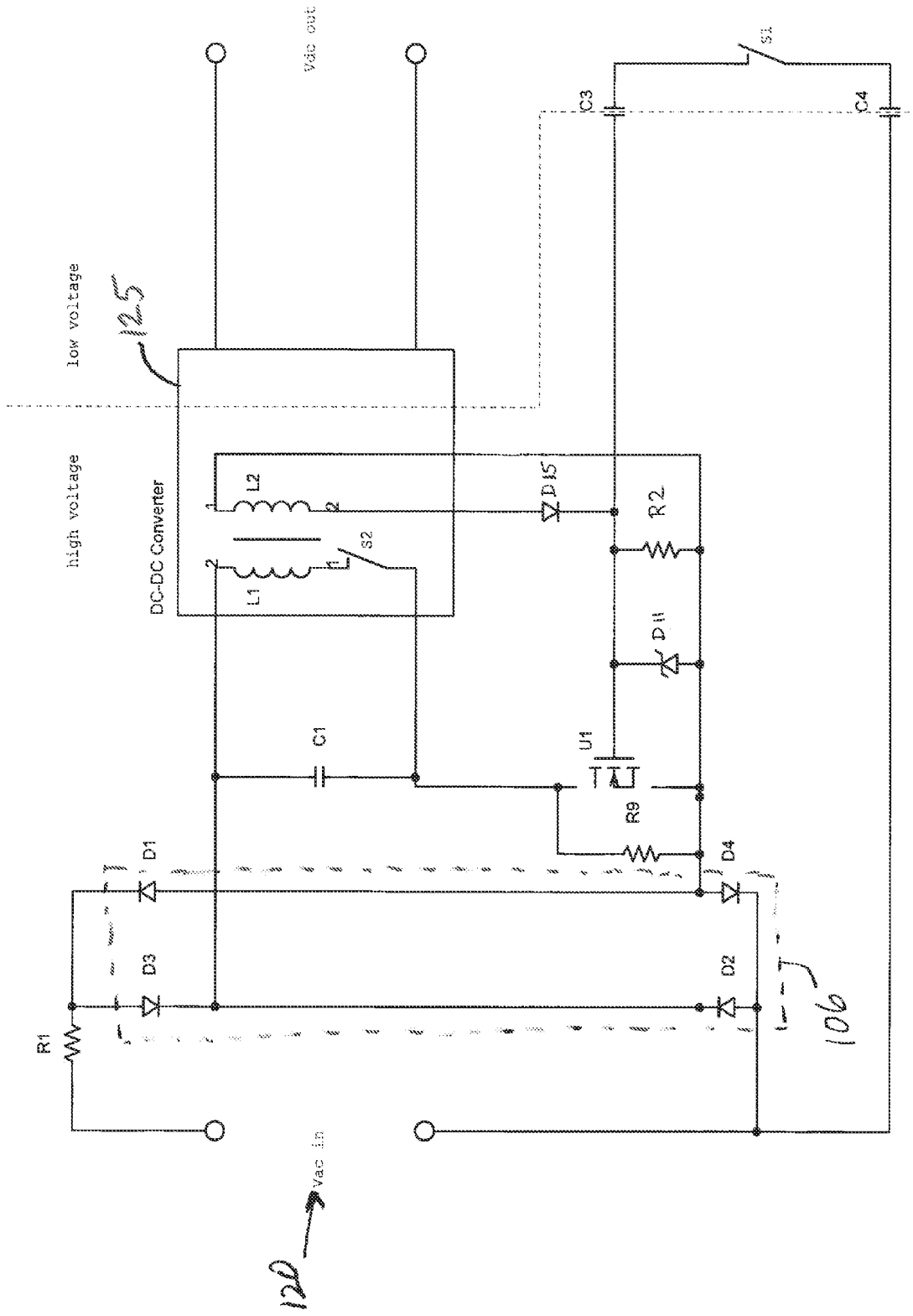

FIG. 11 illustrates another embodiment for reducing the no-load power consumption in a power device. This embodiment is similar to the one shown in FIG. 9, except that instead of the snubber circuit 109, the voltage from an auxiliary winding L2 of the transformer of the DC-DC converter 125 is used to keep the switch U1 turned on once the switch U1 has initially been closed by the closing of the switch S1. Thus, the no-load condition is sensed by the absence of a path between the gate of U1 and Vac thru capacitors C3 and C4 (or in other words, current through C3).

While the invention has been illustrated and described in detail in the drawings and foregoing description, such illustration and description is to be considered as exemplary and not restrictive in character. For example, certain embodiments described hereinabove may be combinable with other described embodiments and/or arranged in other ways (e.g., process elements may be performed in other sequences). Accordingly, it should be understood that only the preferred embodiment and variants thereof have been shown and described and that all changes and modifications that come within the spirit of the invention are desired to be protected.

The invention claimed is:

1. A power device operative to provide power to an electronic device, the power device comprising:
   a power converter that is operative to receive input power from a power source and to provide output power to the electronic device;
   a switch disposed between the power converter and the power source; and
   a switch control module having a control switch and operative to selectively couple the power converter to the power source and to detect a no-load condition, wherein the switch control module detects a no-load condition when the control switch is open and when the output power drops below a predetermined level, wherein the opening of the control switch is independent of the output power dropping below the predetermined level.

2. The power device of claim 1, wherein the switch control module is operative to detect a touch from a user of the power device, and in response to the detecting, to couple the power converter to the power source.

3. The power device of claim 1, wherein, in response to the detecting, the switch control module is operative to decouple the power converter from the power source.

4. A method for reducing the no-load power consumption of a power device, the power device being operative to receive power from a power source and to provide output power to an electronic device, the method comprising:
   operating circuitry of the power device to automatically detect a no-load condition, wherein the circuitry of the power device comprises at least a control switch, and wherein the no-load condition is detected when the control switch is open and the output power drops below a predetermined level, wherein the opening of the control switch is independent of the output power dropping below the predetermined level; and
   in response to the operating, automatically decoupling the power device from the power source.

5. A power device operative to provide power to an electronic device, the power device comprising:
   a rectifier that converts AC input power received from an AC power source to rectified power;
   a power converter that converts the rectified power to DC output power that can be supplied to an electronic device;
   a switch located between the rectifier and the power converter to selectively couple rectified power to the power converter when the switch is closed and substantially decouple the rectified power from the power converter when the switch is open; and
   a switch controller having a control switch and coupled to the switch to control the open or closed status of the switch based on a no-load condition, wherein the no-load condition indicates that the control switch is open and that the DC output power is below a predetermined level, wherein the opening of the control switch is independent of the DC output power being below the predetermined level.

6. A power device as defined in claim 5, wherein the no-load condition is sensed within the power converter.

7. A power device as defined in claim 6, wherein the no-load condition is sensed within the power converter by monitoring the current through a winding in a transformer within the power converter.

8. A power device as defined in claim 7, further including a snubber circuit coupled to the winding.

9. A power device as defined in claim 7, wherein the winding utilized in the power converter is a primary winding.

10. A power device as defined in claim 5, further including an indication received from the electronic device to initially close the switch and couple the rectified power to the power converter.

11. A power device as defined in claim 5, wherein the no-load condition is sensed by monitoring the current through a capacitor coupled between the power device and the electronic device.

12. A power device as defined in claim 11, wherein the electronic device includes a switch therein that controls the ability of the capacitor to carry current therethrough.

13. A power device operative to provide power to an electronic device, the power device comprising:
 a rectifier that converts AC input power received from an AC power source to rectified power;
 a power converter that converts the rectified power to DC output power that can be supplied to an electronic device;
 a switch located between the rectifier and the power converter to selectively couple rectified power to the power converter when the switch is closed and substantially decouple the rectified power from the power converter when the switch is open, the switch having an input; and
 a circuit coupled to the input of the switch to maintain the switch in the closed position in the presence of sufficient current received from the power converter flowing through the circuit and to open the switch in the absence of sufficient current received from the power converter flowing through the circuit such that the current received from the power converter causes the opening and closing of the switch, wherein the circuit is separate from the power converter.

14. A power device as defined in claim 13, wherein the circuit includes a winding in a transformer within the power converter.

15. A power device as defined in claim 14, further including a snubber circuit coupled to the winding.

16. A power device as defined in claim 14, wherein the winding utilized in the power converter is a primary winding.

17. A power device as defined in claim 13, further including an indication received from the electronic device to initially close the switch and couple the rectified power to the power converter.

18. A power device as defined in claim 13, wherein circuit includes a capacitor coupled between the power device and the electronic device.

19. A power device as defined in claim 18, wherein the electronic device includes a switch therein that controls the ability of the capacitor to carry current therethrough.

20. A power device as defined in claim 13, wherein the current is received directly from the output of the power converter.

* * * * *